United States Patent [19]
Anderson

[11] Patent Number: 5,700,019
[45] Date of Patent: Dec. 23, 1997

[54] CHUCKING RING

[75] Inventor: James J. Anderson, 7336 Kilcullen Dr., Charlotte, N.C. 28270

[73] Assignee: James J. Anderson, Charlotte, N.C.

[21] Appl. No.: 667,641

[22] Filed: Jun. 21, 1996

[51] Int. Cl.⁶ .......................... B23B 31/16; B23B 13/12
[52] U.S. Cl. ...................... 279/154; 279/156; 279/157
[58] Field of Search ................................ 279/123, 154, 279/156, 157

[56] References Cited

U.S. PATENT DOCUMENTS

| | | | |
|---|---|---|---|
| 3,104,474 | 9/1963 | Rehart | 279/154 |
| 3,160,042 | 12/1964 | Grand | 279/154 |
| 5,251,918 | 10/1993 | Morgan | 279/156 |

*Primary Examiner*—Steven C. Bishop
*Attorney, Agent, or Firm*—Clifton Ted Hunt

[57] ABSTRACT

The chucking ring of this invention finds its principal utility in the clamping of top jaws used in a machine tool, such as a lathe, having a chuck and equipped to machine successive workpieces. The chucking ring includes a flanged head on one end of a tubular body portion that removably receives a plug and an adjustable stop for workpieces. The chucking ring is fastened to the chuck with bolts in its inactive position where it functions as a replacement for a chip bushing. The bolts may be removed and the chucking ring rotated to its active position with the flanges on the head aligned with the master jaws for chucking by the master jaws. The top jaws are bolted to the master jaws for machining.

10 Claims, 7 Drawing Sheets

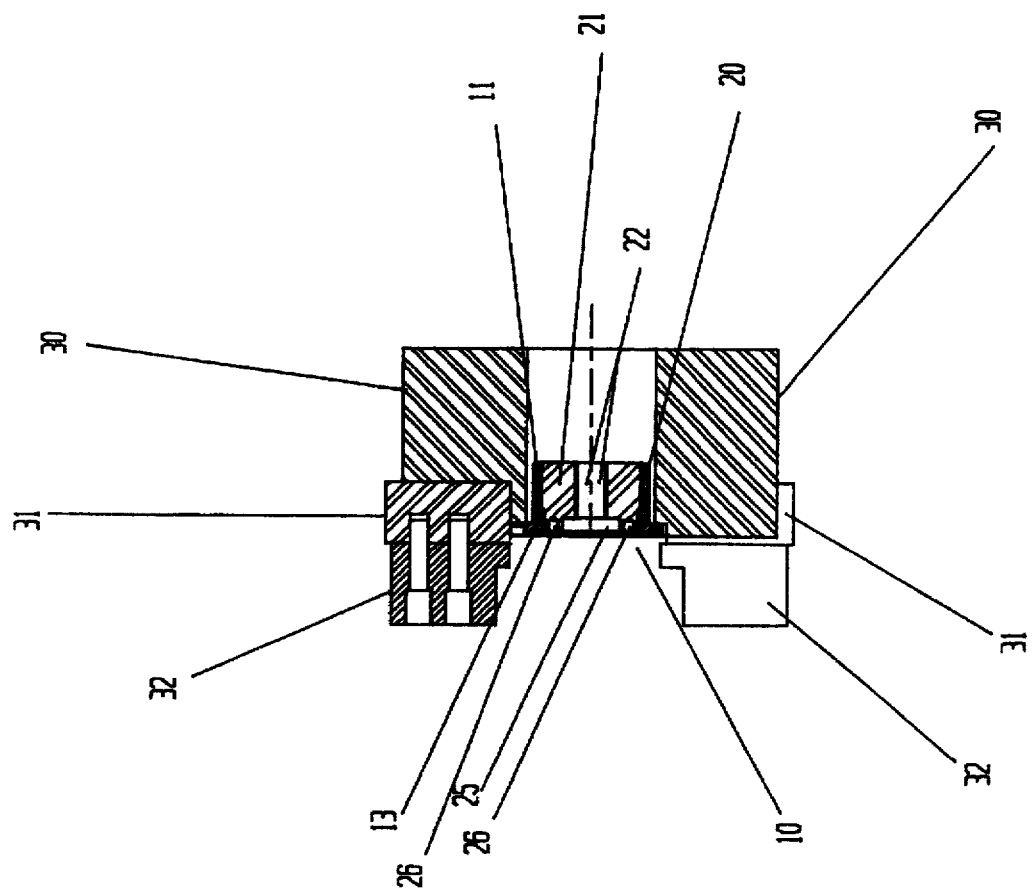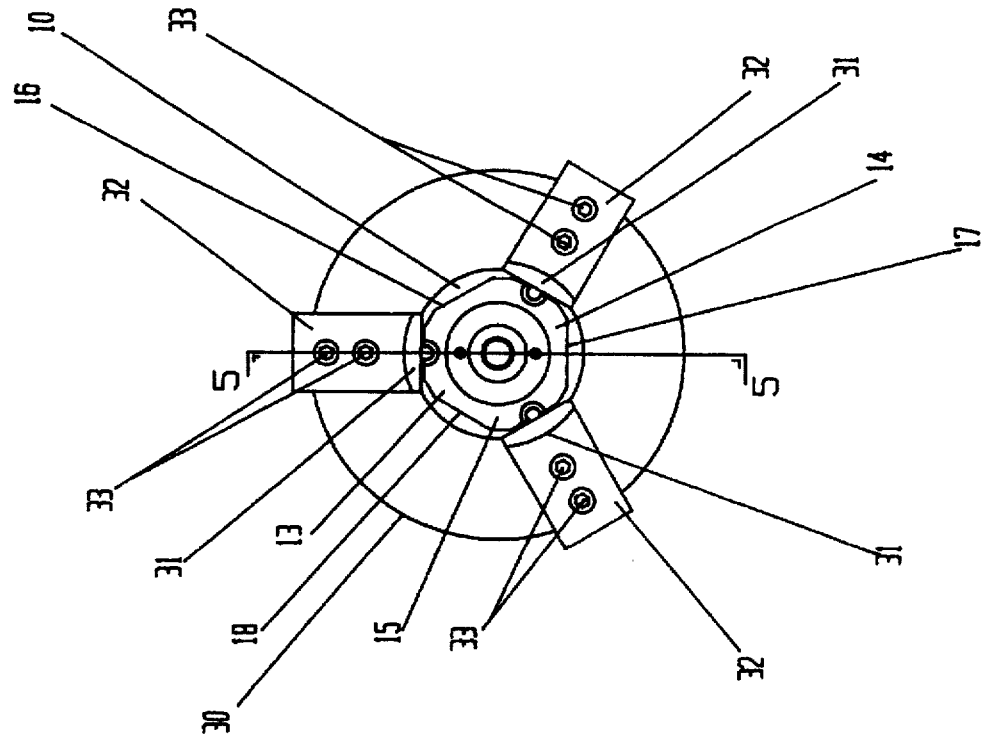

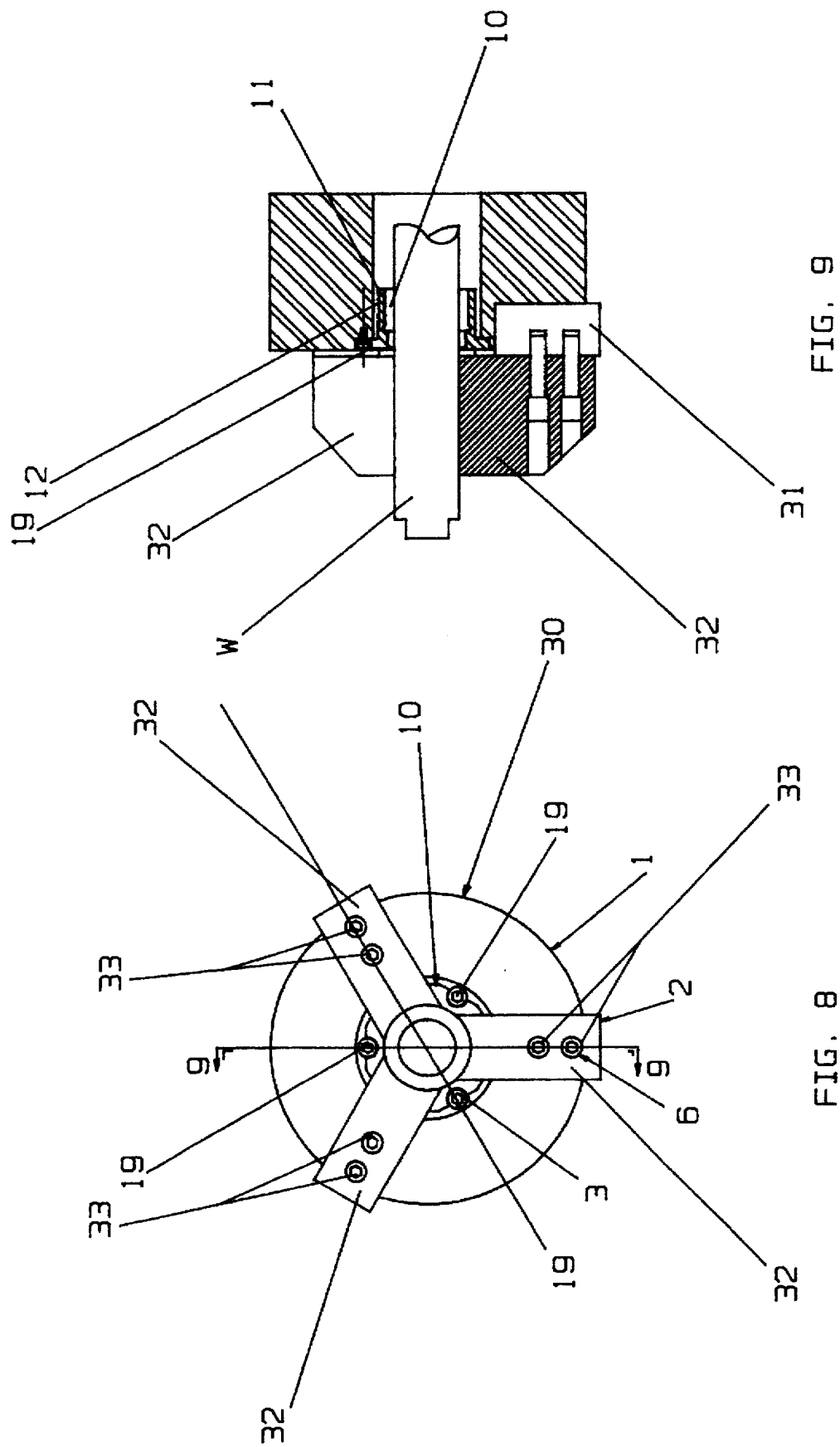

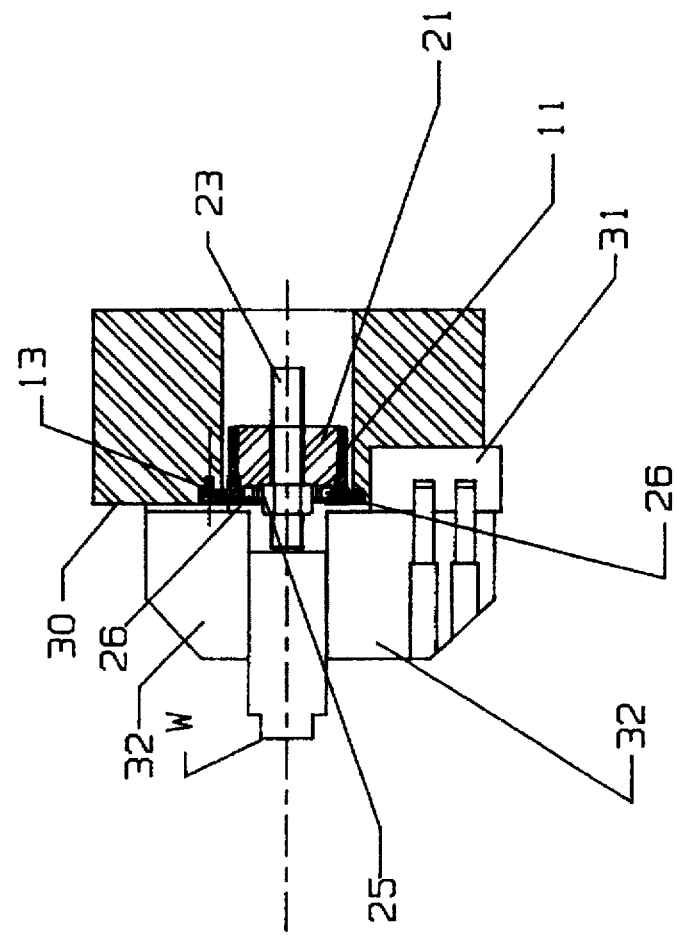
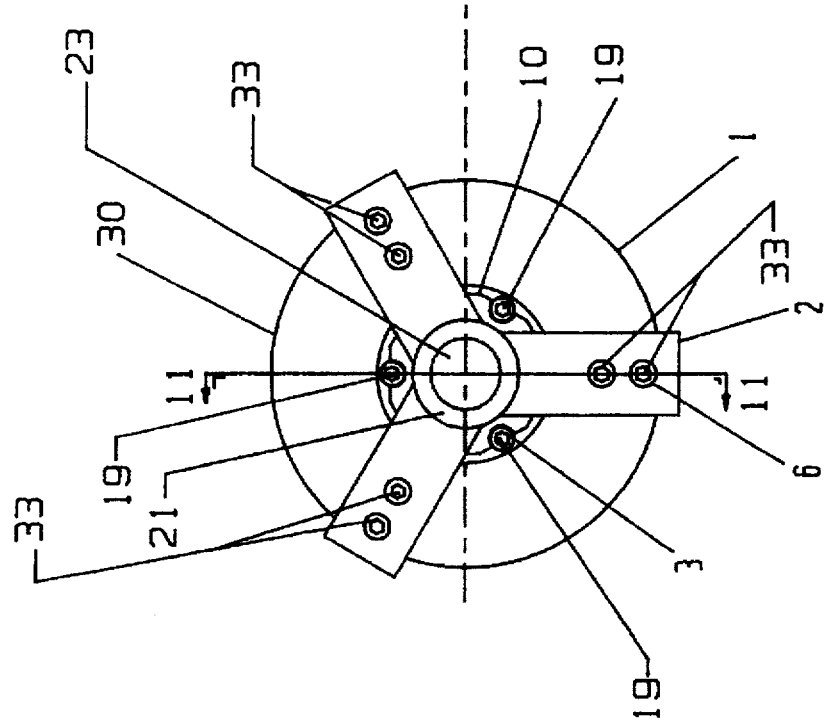
FIG. 10
FIG. 11

5,700,019

CHUCKING RING

FIELD OF THE INVENTION

This invention relates to the machining of top jaws in the power actuated chuck bodies of machine tools. The machining of the top jaws is necessarily done to conform the top jaws with specific workpieces to be chucked and machined.

BACKGROUND OF THE INVENTION

Machine tools, such as lathes, conventionally include power actuated cylindrical chuck bodies having three master jaws spaced 120 degrees from each other and mounted in the chuck body for radial inward and outward movement and for the reciprocatory axial movement required for the optimum chucking or clamping of different workpieces. Top jaws (also known as soft jaws) are removably bolted to the master jaws. A hydraulic ram system causes movement of the master jaws as required to machine the top jaws and clamp each workpiece. A chip bushing is usually installed between the master jaws to prevent chips and dust from fouling the interior of the chuck body.

Before a workpiece can be machined, the top jaws must first be clamped and then machined to the shape and spacing required for each specific workpiece. The machining of the top jaws to conform with each specific workpiece is necessary in order for the top jaws to accurately and adequately clamp the workpiece so it can be accurately machined to the required tolerances.

The initial dimensions of top jaws vary. Because of this, the clamping of the top jaws for machining is a laborious process and relatively expensive procedure.

Efforts have been made in the prior art to reduce the time and expense required to machine the top jaws. One such effort is generally known as an adjustable spider. The adjustable spider is clamped by the top jaws, not allowing the top jaws to be bored through and requiring adjustment for each different placement of the top jaws. A jaw machining fixture, or forming device, is another prior art apparatus used for machining top jaws. The jaw machining fixture uses the bolt holes counterbored in the top jaws. The added height of the forming device does not allow the use of short boring bars on smaller diameters.

Both of these items clamp on the top jaws and neither of them replaces the conventional dust cover or chip bushing that protects the interior of the chuck from the chips and dust created while machining workpieces.

SUMMARY OF THE INVENTION

The chucking ring of this invention eliminates the need for clamping the top jaws, thereby eliminating the time and effort heretofore required for clamping the top jaws before machining them for each job. The chucking ring also replaces the chip bushing by being mounted on the chuck in place of the chip bushing and functioning as a chip bushing when rotated to its inactive position. Screws fasten the head of the chucking ring to the chuck body while the chuck ring functions as a dust cover or chip bushing in its inactive position. The screws are removed to rotate the chucking ring from its inactive position to its active position where it is clamped by the master jaws while the top jaws, bolted to the master jaws, are machined to conform with a workpiece.

When the chucking ring is in its active position, its flanges align with the master jaws. The master jaws are then moved inwardly by the hydraulic ram to clamp the flanges of the chucking ring. Top jaws are bolted to the master jaws and effectively clamped in approximate center stroke without concern for the dimensions of the top jaws.

The chucking ring is interiorly threaded for reception of a tubular plug that may be threaded through the chucking ring. The plug strengthens the chucking ring against the clamping pressure of the master jaws. The tubular plug is interiorly threaded for reception of an adjustable stop for positioning a workpiece in a desired location. With the adjustable stop in place, the tubular plug can be used to prevent coolant from entering the spindle while machining a workpiece. The threaded plug can be removed from the chucking ring for machining an elongated workpiece, when desired.

Another advantage of clamping the chucking ring instead of the top jaws is that the top jaws can be bored throughout their length.

BRIEF DESCRIPTION OF THE DRAWINGS

FIG. 4 is an end view of a chuck showing the master jaws clamping the chucking ring for machining of the top jaws;

FIG. 5 is a sectional view taken substantially along the line 5—5 in FIG. 4 and showing the tubular plug operably positioned in the chucking ring;

FIG. 8 is an end view of a chuck showing the chucking ring rotated to its inactive position and illustrating the clamping of a first workpiece by the top jaws;

FIG. 9 is a vertical sectional view taken substantially along the line 9—9 in FIG. 8, and illustrating the ability of the chucking ring to receive an elongated workpiece by removal of the tubular plug;

FIG. 10 is an end view of a chuck showing the chucking ring rotated to its inactive position, like FIG. 8, and illustrating the clamping of a second workpiece by the top jaws; and FIG. 11 is a sectional view taken substantially along the line 11—11 in FIG. 10 and illustrating use of the chucking ring to support an adjustable work stop that locates a workpiece clamped by the top jaws.

DETAILED DESCRIPTION OF THE INVENTION

Figure 1:
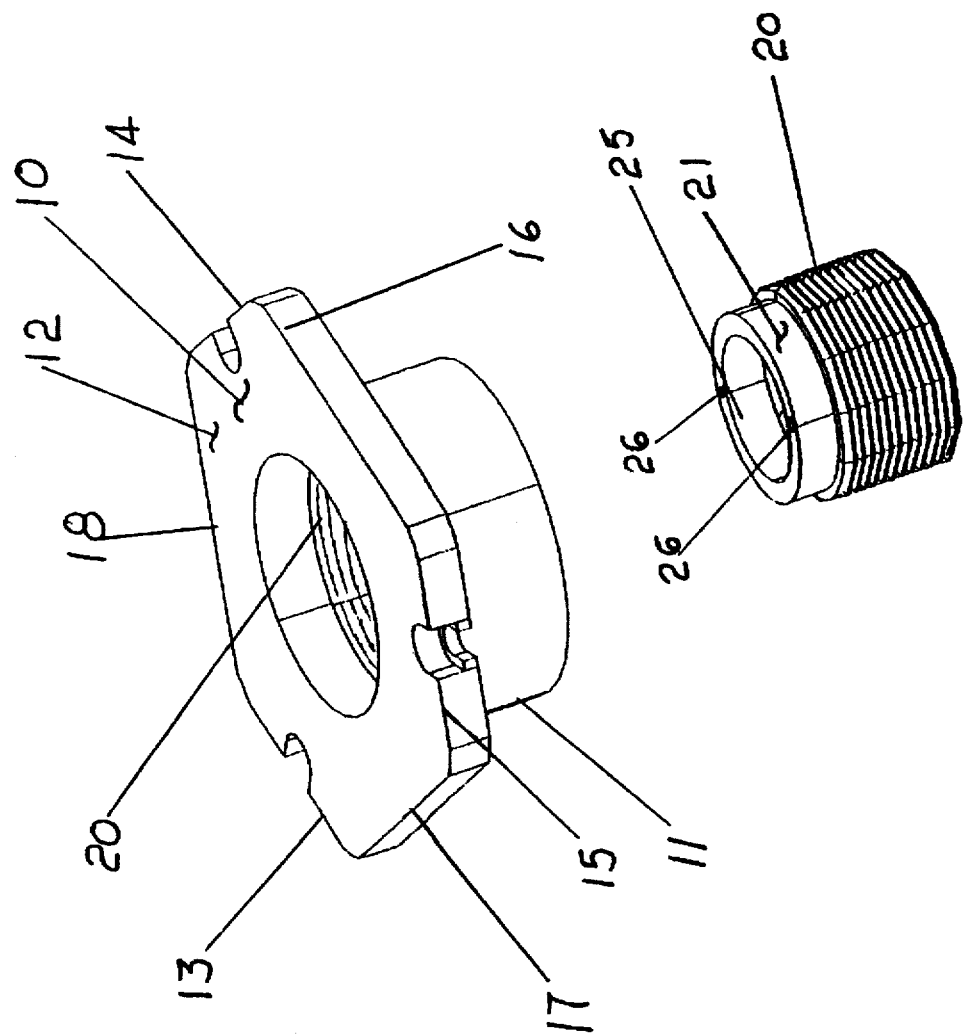
FIG. 1 is an exploded perspective view looking at the front and top of the chucking ring of this invention.

The chucking ring 10 of this invention is used in a conventional power actuated chuck body 30 comprising the usual master jaws 31 and having successive top jaws 32 bolted, as by bolts 33, to the master jaws to be machined for successive work pieces W.

Figure 3:
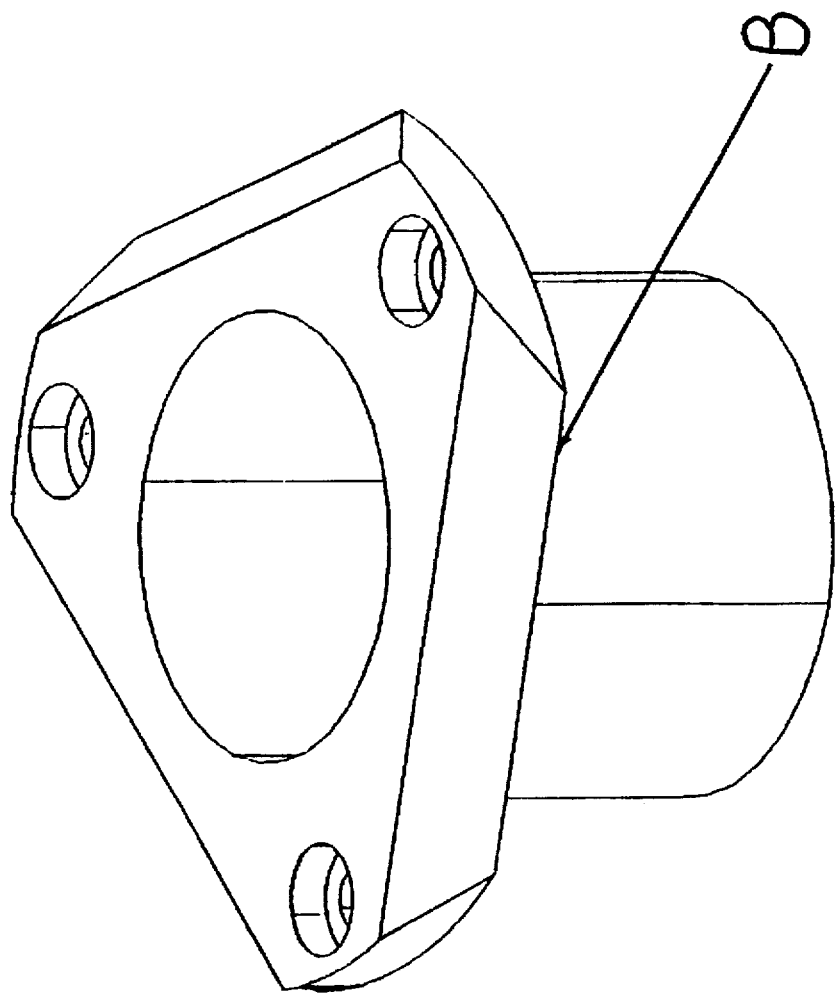
FIG. 3 is a perspective view looking at the front and top of a prior art dust cover, also known as a chip bushing.

The chucking ring 10 is permanently installed in a chuck and provides a readily available chucking device for the top jaws being machined. The chucking ring is also helpful in the machining of certain types of workpieces. Another advantage of the permanently installed chucking ring is that it eliminates the need for the prior art chip bushing B of FIG. 3. The chucking ring can be rotated to an inactive position and there serve the same function as the prior art chip bushing B, to prevent dust and chips from fouling the interior of the chuck.

Figure 7:
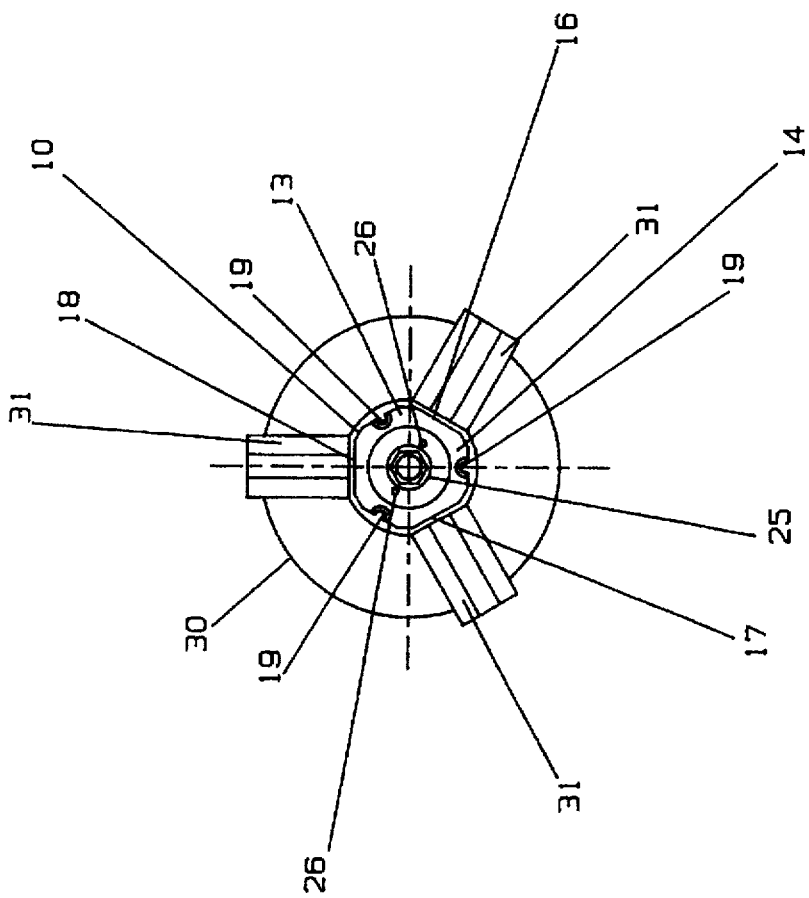
FIG. 7 is an end view of a chuck similar to FIG. 6, but showing the chucking ring rotated from the active clamping position of FIG. 4 to its inactive position to function as a conventional chip bushing.
Figure 6:
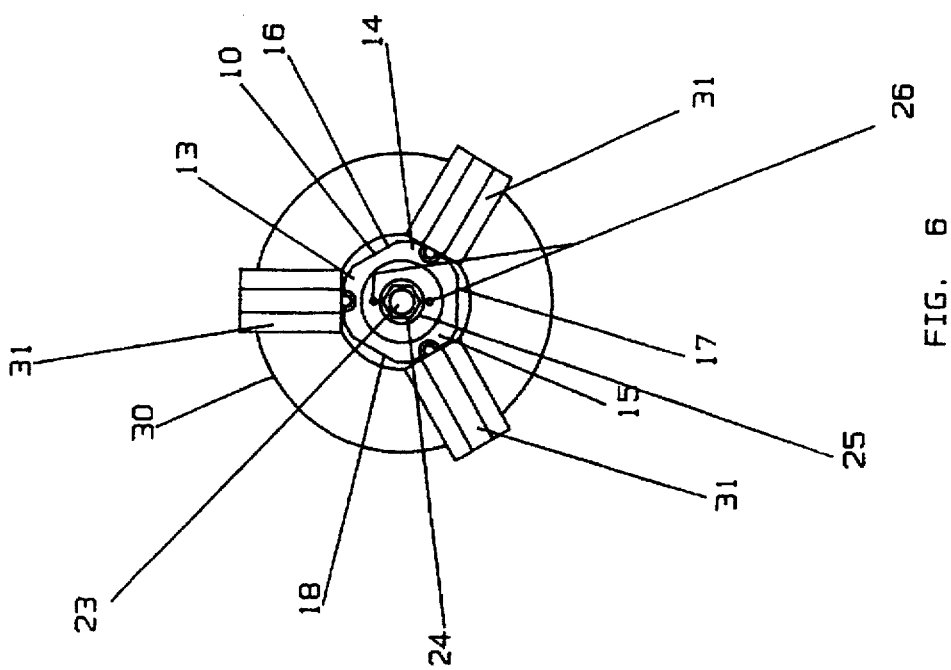
FIG. 6 is an end view of a chuck similar to FIG. 4, but omitting the top jaws for purposes of clarity.

The chucking ring 10 comprises a tubular body portion 11 terminating at one end in an annular head 12. The shape of the head 12 is similar to the shape of the prior art chip bushing B. Three flanges 13, 14 and 15, spaced 120 degrees from each other, extend radially outwardly from the head 12. The relatively recessed peripheral portions of the head 12 between the flanges 13–15 are flat, as indicated at 16, 17 and 18 in FIG. 1. Bolts 19 attach the chucking ring 10 to the chuck 30 when the chucking ring is in its inactive position (FIGS. 7, 8 and 10).

Unlike successive top jaws, the diameter and spacing of the flanges 13–15 on the chucking ring 10 are constant, thereby enabling quick and secure clamping of the chucking ring each time it is used for machining top jaws.

Figure 2:
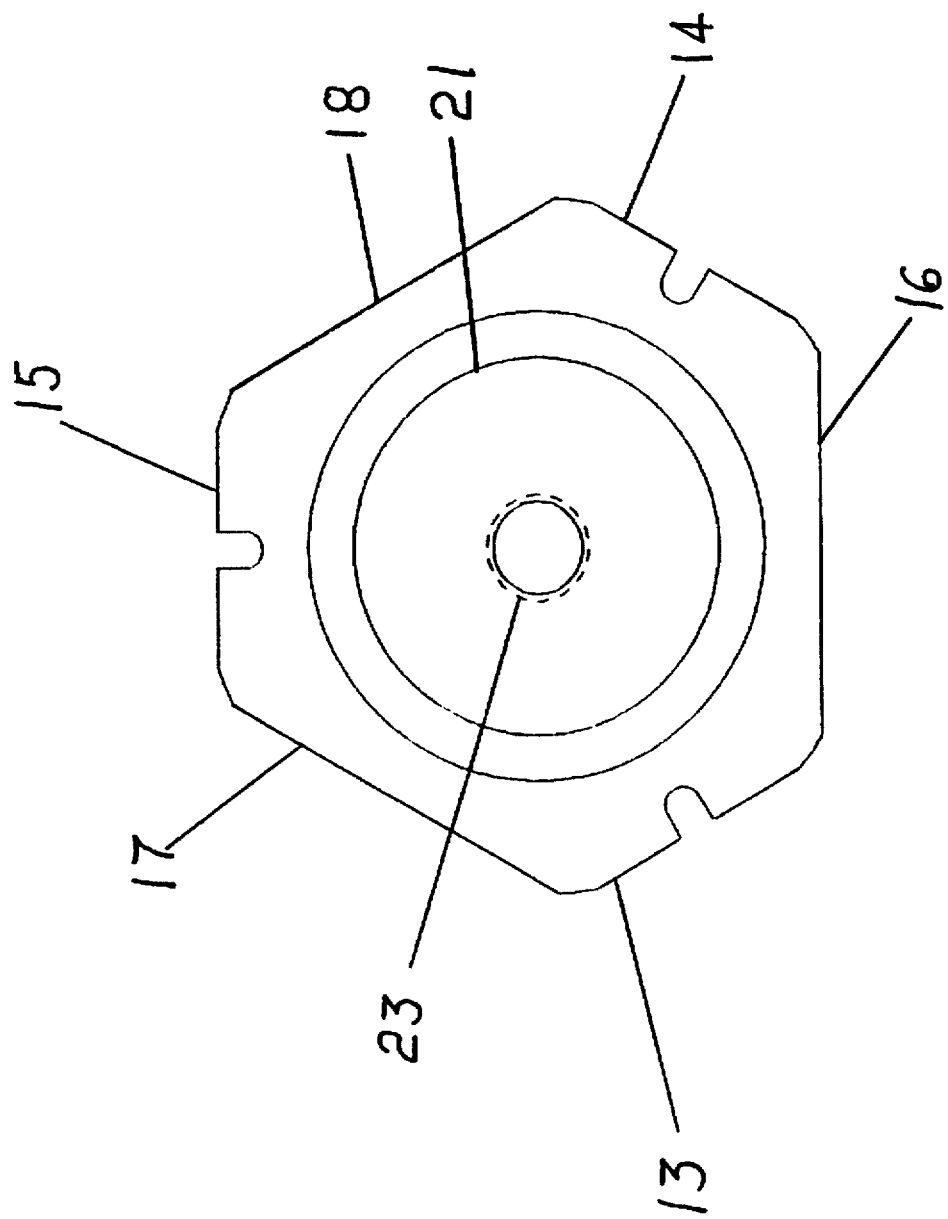
FIG. 2 is a rear view of the chucking ring.

The tubular body portion 11 of the chucking ring 10 is interiorly threaded as at 20 in FIG. 2 to removably receive a tubular plug 21. The tubular plug 21 is exteriorly threaded as at 20 to correspond with the interior threading 20 of the body portion 11 of the chucking ring. The tubular plug 21 is also interiorly threaded as at 22 to threadably receive a correspondingly threaded adjustable stop 23 (FIG. 11 ). The adjustable stop 23 may be rotated within the plug 21 to extend from the plug the distance required to function as a work stop for specific workpieces W. A nut 24 is threaded on the adjustable stop 23 and beam against a depression 25 in the plug 21 to hold the adjustable stop 23 at the desired location to support a workpiece W.

A pair of spaced holes 26 extend into the plug 21 on opposite sides of the depression 25. The function of the holes 26 is to receive a spanner wrench (not shown) that is used to rotate the plug while operably installing the plug 21 in the tubular housing 11 of the chucking ring, and removing the plug from the chucking ring, when desired.

The tubular plug 21 is installed in the tubular body portion 11 preparatory to the machining of top jaws 32 that have been bolted to the master jaws 31, as seen in FIG. 4. The master jaws 31 are then activated to clamp the flanges 13–15 of the chucking ring 10 while the top jaws are machined as required to clamp a specific workpiece. The tubular plug 21, installed in the tubular body portion 11, receives the clamping pressure applied to the flanges 13–15 of the chucking ring by the master jaws 31. The plug 21 thereby desirably strengthens the chucking ring 10.

The tubular plug can remain in the body portion 11 during production runs to prevent dust, chips and coolant from entering the spindle. While in the body portion 11 of the chucking ring 10, the adjustable stop 23 may be threaded through the tubular plug 21 to serve as a stop for a workpiece W (FIG. 11 ). The tubular plug 21 is removed from the body portion 11 when it is desired to feed elongated workpieces, such as bars, through the chucking ring, as in FIG. 9.

There is thus provided a novel and useful chucking ring with numerous advantages, which include:

(1) the primary advantage of being permanently installed on a chuck and readily available to be rotated between its active position for quick and easy chucking by the master jaws to machine top jaws, and its inactive position where it functions as a chip bushing while fastened by bolts to the chuck;

(2) the tubular plug is removable from the chucking ring to accommodate elongated workpieces;

(3) the adjustable stop may be positioned and locked within the tubular plug to extend a desired distance from the chuck to locate a workpiece; and (4) the plug and the stop may remain in the chucking ring to prevent coolant from fouling the spindle.

I claim:

1. A chucking ring for use in a machine tool having a chuck, master jaws, top jaws and means for machining the top jaws preparatory to the top jaws chucking successive workpieces, the chucking ring comprising:

(a) a tubular body portion;

(b) a head at one end of the tubular body portion, the head including:

(i) a plurality of flanges extending radially from the head and (ii) flat, relatively recessed peripheral portions of the head between the flanges; and (c) means for attaching the chucking ring to the chuck; whereby the chucking ring may be moved to an active position with the flanges aligned with the master jaws for chucking of the chucking ring by the master jaws and to an inactive position with the flanges spaced from the master jaws.

2. The invention of claim 1 wherein the means for attaching the chucking ring to the chuck comprises bolts extending through the head of the chucking ring and threaded into the chuck.

3. The invention of claim 2 wherein the chucking ring functions as a chip bushing in the inactive position of the chucking ring.

4. The invention of claim 1 wherein the chucking ring includes a plug within the tubular body portion.

5. The invention of claim 4 wherein the plug is removable from the tubular body portion.

6. The invention of claim 4 wherein the plug is tubular.

7. The invention of claim 6 wherein an adjustable stop is removably mounted in the plug.

8. A chucking ring for use in a machine tool having a chuck, master jaws, top jaws and means for machining the top jaws preparatory to the top jaws chucking successive workpieces, the chucking ring comprising:

(a) a tubular body portion;

(b) a tubular plug threadably received in the tubular body portion;

(c) an adjustable stop threadably received in the tubular plug;

(d) means for locking the adjustable stop at a desired position relative to the tubular plug;

(e) a head at one end of the tubular body portion, the head including:

(i) a plurality of flanges extending radially from the head and (ii) flat, relatively recessed peripheral portions of the head between the flanges; and (f) means for attaching the chucking ring to the chuck.

9. The invention of claim 1 wherein the tubular plug includes means for rotating the plug relative to the tubular body portion.

10. The method of clamping top jaws for machining preparatory to machining a workpiece in a machine tool having a chuck and master jaws, the method comprising the steps of:

(a) bolting the top jaws to the master jaws;

(b) providing a chucking ring including:

(i) a head and (ii) flanges extending radially from the head in spaced relation to each other;

(c) positioning the chucking ring in the chuck in an active position with the flanges in alignment with the master jaws;

(d) fastening the chucking ring to the chuck for rotation of the chucking ring relative to the chuck;

(e) rotating the chucking ring into the active position to be chucked by the master jaws and out of the active position for machining a workpiece;

(f) moving the master jaws into chucking relation with the flanges on the head of the chucking ring; and (g) machining the top jaws.

* * * * *